United States Patent [19]

Ōmori et al.

[11] 4,019,187
[45] Apr. 19, 1977

[54] INK JET RECORDING APPARATUS

[75] Inventors: Hideyuki Ōmori, Hitachi; Yoshio Ouchi, Mito; Takatoshi Ikeda; Toshio Tsubaki, both of Hitachi, all of Japan

[73] Assignee: Hitachi, Ltd., Japan

[22] Filed: Mar. 17, 1976

[21] Appl. No.: 667,469

[30] Foreign Application Priority Data

Mar. 19, 1975 Japan .............................. 50-32356

[52] U.S. Cl. .................................. 346/75; 101/35; 118/2
[51] Int. Cl.² .................. G01D 15/18; B41F 17/16
[58] Field of Search .......... 346/75; 101/35, DIG. 3; 118/2

[56] References Cited

UNITED STATES PATENTS

| | | | |
|---|---|---|---|
| 3,370,297 | 2/1968 | Burton | 346/75 |
| 3,852,772 | 12/1974 | Hecht | 346/75 |
| 3,867,882 | 2/1975 | Ahlgren | 101/35 |
| 3,911,818 | 10/1975 | Macilvaine | 346/75 X |

*Primary Examiner*—Joseph W. Hartary
*Attorney, Agent, or Firm*—Craig & Antonelli

[57] ABSTRACT

An ink jet recording apparatus for recording information pattern on articles transported by a conveyer, by an ink jet recording method. The recording apparatus includes means for preventing the articles from undergoing defective recording even when the transport of the record medium is unexpectedly stopped.

4 Claims, 5 Drawing Figures

INK JET RECORDING APPARATUS

BACKGROUND OF THE INVENTION

1. Field Of The Invention

The present invention relates to an ink jet recording apparatus, and more particularly to an ink jet recording apparatus of the type in which information pattern is recorded on an article transported by a conveyer.

2. Description Of The Prior Art

In a plant for mass production a conveyer system is sometimes utilized for transporting products. When such products are required to be marked with some information such as manufacture date or the like, an ink jet recording method is advantageously used. In the ink jet recording method, the recording is applied to such products or articles while they are moving in such a way that ink droplets are projected in a direction lying on a plane substantially perpendicular to the direction of the movement of the articles while changing its direction in scanning mode so that the ink droplets are applied within a predetermined area of the surface of the article thereby to form a desired information pattern in the form of matrix of ink spots. Accordingly, if the movement of an article is suddenly stopped, it fails to completely record the desired information pattern on the surface of the article and the ink droplets are projected onto the same portion of the surface. Thus, the article is usually subject to a faulty product due to the defective record.

SUMMARY OF THE INVENTION

It is an object of the present invention to provide an ink jet recording apparatus which is capable of preventing occurrence of such faulty articles having defective records.

It is another object of the present invention to provide an ink jet recording apparatus which prevents the recording from being stopped before the recording on an article is not finished when the transport of the articles is stopped.

It is a further object of the present invention to provide an ink jet recording apparatus which prevents the occurrence of a faulty article having a defective recording due to the movement, by inertia, of the conveyer after disenergization of the same.

According to the present invention, an ink jet recording apparatus is provided which comprises a trouble detection circuit for detecting a trouble in transporting the articles and a record completion detection circuit for detecting the completion of record of information on each article, and means for stopping the operation of the ink jet recording under the presence of both outputs from the two detection circuits.

The foregoing and other objects, features and advantages of the present invention will become more apparent from the following detailed description of the preferred embodiments of the invention when taken in conjunction with the accompanying drawings.

DETAILED DESCRIPTION OF THE PREFERRED EMBODIMENTS

The present invention will be described in connection with an ink jet recording apparatus applied for marking manufacture date on a lid (end surface) of a can.

Figure 1:
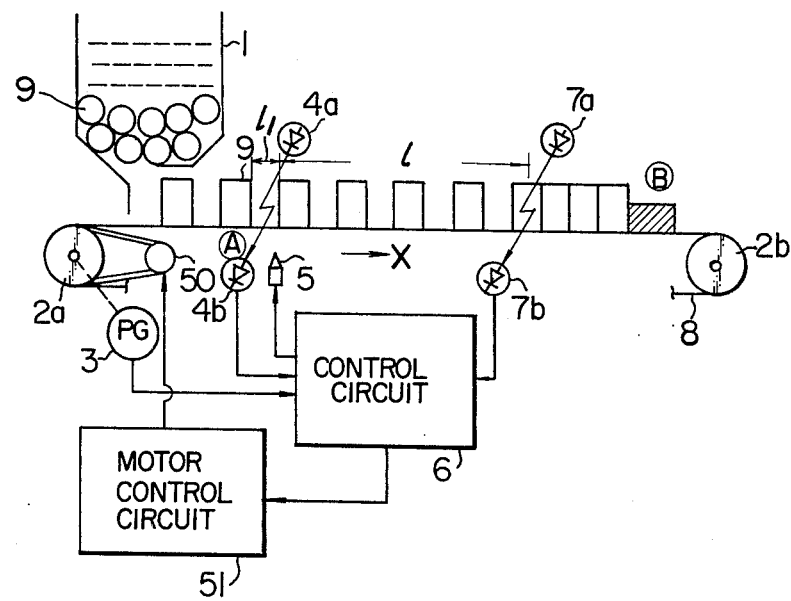
FIG. 1 shows a block diagram of an ink jet recording apparatus in accordance with the present invention.

In FIG. 1, a depalletizer 1 stores a number of cans 9 therein and has a bottom opening from which the cans are supplied onto a conveyer 8 one by one at fixed intervals. The conveyer 8 spans across drive wheels 2a and 2b and is driven by a drive motor 50 in the direction of the arrow X. A pulse generator 3 is mechanically coupled to the drive wheel 2a and produces one electrical pulse for each predetermined increment of movement of the conveyer 8. A light emitting element 4a and a light sensing element 4b are arranged on opposite sides of the conveyer 8 to form a can detector, which, each time a can 9 intercepts the transmission of light between the elements 4a and 4b, causes the light sensing element 4b to generate a detection signal output. An ink jet recording head 5 is arranged to face to an end surface of the can 9 passing there and having a nozzle for injecting ink droplets as scanning transversely to the direction of the movement of the cans 9. A light emitting element 7a and a light sensing element 7b are arranged at opposite sides of the conveyer 8 to face each other and form a trouble detector which, each time the can 9 intercepts the transmission of light between the elements 7a and 7b, produces one detection signal. A motor control circuit 51 controls the speed, and start and stop of the drive motor 50. A control circuit 6 receives output signals from a pulse generator 3, the can detector 4a and 4b, and the trouble detector 7a and 7b thereby to apply control signals to the ink jet recording head 5 and the motor control circuit 51, respectively.

The motor control circuit is further explained with reference to FIG. 2, in which digital counters 15, 16 and 17 are provided to produce a high level output each time when the number of input pulses reaches $N_1$, $N_2$ and $N_3$, respectively. The number $N_1$ corresponds to the distance between a can detection position where the can intercepts the light to the can detector to cause the element 4b to produce its detection signal and a predetermined record start position and the number $N_2$ corresponds to the distance between the record start position and a predetermined record end position. The record start and record end positions are determined so that if the recording operation starts when a can reaches the record start position and ends when it reaches the record end position, the record will be applied to the desired area on the surface of the can. Thus, the number $N_2$ corresponds to the length of the record measured in the direction of the can travel. The number $N_3$ is determined to correspond to a predetermined distance, as called hereinafter "trouble detection distance" larger than the diameter of the can, i.e. the width of the can measured in the direction of its travel. The relationship between the above numbers is shown in FIG. 3.

Figure 3:
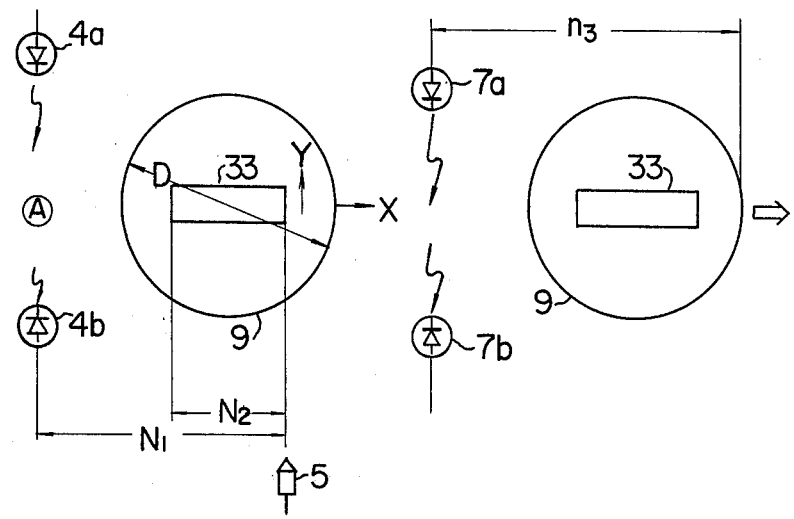
FIG. 3 shows dimensional relationship of an article and the record applied thereto.

In FIG. 3, the reference numeral 33 represents the area where the record is to be applied, X represents the direction of movement of the can 9, Y represents the direction of scanning of the ink droplets, and A represents the can detection point.

Referring again to FIG. 2, flip-flop circuits 22, 23, 24 and 25 are provided, to produce high level voltage signals at their output terminals Q when high level voltage signals are applied to their set terminals S and to produce high level voltage signals at their output terminals $\overline{Q}$ when high level voltage signals are applied to their reset terminals R. The set terminal S of the flip-flop 22 is connected to the light sensing element 4b of the can detector and its reset terminal R is connected to the output terminal $\overline{Q}$ of the flip-flop 23. Two input terminals of an AND gate 18 are connected to the output terminal Q of the flip-flop 22 and the pulse generator 3, respectively, and an output terminal of the AND gate 18 is connected to an input terminal of a counter 15, the output terminal of which is connected to the set terminal S of the flip-flop 23 and the clear terminal of which is connected to the output terminal $\overline{Q}$ of the flip-flop 23. A recording control circuit 26 controls the amounts of deflection of the ink droplets ejected from the recording head 5 onto the article to be recorded. The control circuit 26 is similar to that used in a conventional ink jet recording apparatus as disclosed in U.S. Pat. Spec. No. 3,631,511 issued Dec. 28, 1971, inventors Robert I. Keur and Vincent E. Bischoff granted on U.S. Pat. application Ser. No. 35,650 filed May 8, 1970, and hence the detailed explanation thereof is omitted. Recording is effected when the output terminal Q of the flip-flop 23 is at high level. An AND gate 19 has two input terminals, one of which is connected to the pulse generator 3, and the other of which is connected to the output terminal Q of the flip-flop 23 and also has an output terminal connected to an input terminal of a counter 16. The counter 16 further has a clear terminal connected to the output terminal $\overline{Q}$ of the flip-flop 23 and an output terminal connected to the reset terminal R of the flip-flop 23 and one of input terminals of an AND gate 21. AND gates 61 and 62 have their output terminals connected to the set terminals S and the reset terminal R, respectively, of the flip-flop 24. The output terminal of the light sensing element 7b of the trouble detector is connected to one input terminal of the AND gate 61 and to one input terminal of the AND gate 62 through an invertor 63. The output terminal Q of the flip-flop 24 is directly connected to one input terminal of an AND gate 20 and to the other input terminal of the AND gate 62, and also to the other input terminal of the AND gate 61 through an inventer 64. The AND gate 20 has another input terminal connected to the pulse generator 3 and an output terminal connected to an input terminal of a counter 17. An output terminal of the counter 17 is connected to the set terminal S of the flip-flop 25 and a clear terminal thereof is connected to the output terminal $\overline{Q}$ of the flip-flop 24. The output terminal Q of the flip-flop 25 is connected to the other input terminal of the AND gate 21 and the reset terminal R thereof is connected to a reset switch 65. The output terminal of the AND gate 21 is connected to the recording control circuit 26 and to the motor control circuit 51. When a high level signal voltage appears at the output terminal of the AND gate 21, the drive motor 50 is stopped and the recording is interrupted.

The recording operation is now explained.

At the state where the cans 9 are transported by the conveyer 8 at a normal speed, the cans 9 each intercepts the light to the light sensing element 4b of the can detector when passing there, thereby to cause the sensing element 4b to supply the flip-flop 22 with a high level voltage at its output terminal Q. The pulse generator 3 generates pulse signals in accordance with the movement of the conveyor 8, and the pulse signals are applied to the counter 15 while the voltage at the output terminal Q of the flip-flop 22 is at the high level. When the number of the input pulses to the counter 15 reaches the present number $N_1$, that is, the can 9 has reached the recording position as described before with reference to FIG. 3, the output terminal of the counter 15 produces a high level signal. By the high level signal of the counter 15, the flip-flop 23 is set and the output terminal Q thereof is brought to a high level so that the recording control circuit 26 initiates the operation of the recording head in the recording mode. When the output terminal Q of the flip-flop 23 assumes the high level, the one input terminal of the AND gate 19 is also brought to high level and thereby the output pulses from the pulse generator 3 are applied to the counter 16, which is preset to the number $N_2$. When the number of pulses applied to the counter 16 reaches $N_2$, the output terminal thereof is brought to high level. Then, the flip-flop 23 is reset and the output terminal Q thereof returns to low level thereby to cause the recording control circuit to stop the recording operation, while the output terminal $\overline{Q}$ thereof becomes high level so that the counters 15 and 16 are cleared and the flip-flop 22 is reset. The preset number $N_2$ is selected to be equal to the number of pulses generated from the pulse generator 3 as the conveyer 8 is moved by a distance corresponding to the length of the area where the information is recorded, as described before with reference to FIG. 3. Thus, by transporting the cans 9 one by one with intervals of a distance larger than the distance corresponding to $N_1 + N_2$ between the trailing end of each can 9 and a leading end of the following can 9, the ink jet recording can be effected on the cans by the repetition of the above operation. While the can 9 intercepts the light to the light sensing element 7b of the trouble detector, the flip-flop 24 is set and the one input terminal of the AND gate 20 is at high level. Accordingly, the counter 17 counts the output pulses from the pulse generator 3, and before its count reaches $N_3$ corresponding to the trouble detection distance larger than the diameter of the can, the can leaves the trouble detector if the can is transported without any trouble. Thus, the output of the trouble detector becomes low level thereby to reset the flip-flop 24, which in turn clears the counter 17 and causes the AND gate 20 to prevent the pulses from the pulse generator from being applied to the counter 17, before the counter 17 counts $N_3$, thereby preventing the output of the counter 17 from being brough to high level so that the flip-flop 25 is prevented from being set. Consequently, the output terminal Q of the flip-flop 25 retains at the low level and hence the output terminal of the AND gate 21 does not produce a high level signal. Thus, the recording control circuit 26 does not produce a stop signal thereby to allow the recording control circuit 26 and the motor control circuit 51 to continue the recording operation while moving the conveyer.

Next, the case where some trouble occurs in the can feeding so that the movement of the can is blocked at point B in FIG. 1 while the conveyer continues its movement is explained. In this case, the light to the light sensing element 7b of the trouble detector remains blocked. During this period, the flip-flop 24 remains set and the output terminal Q assumes high level so that the AND gate 20 allows the output pulses from the pulse generator 3 to be applied to the counter 17. Since the counter 17 is preset to the number $N_3$ which is slightly larger than the number of pulses which will be generated by the trouble detector when the can 9 passes the trouble detecting distance without any trouble, the counter 17 reaches $N_3$ if the can 9 stops there, while the conveyer 8 continues its movement. Then, the output terminal of the counter 17 produces a high level signal and the flip-flop 25 is set so that the output terminal Q thereof becomes high level. The high level voltage at the output terminal Q of the flip-flop 25 indicates the occurrence of abnormal state in the travel of the cans 9. While, the output terminal of the counter 16 is at low level thereby to allow the recording control circuit and the motor control circuit to continue their operations until it counts $N_2$, that is during one cycle of the recording operation. Therefore, the output of the AND gate 21 is also maintained at low level. When the recording is finished, the output terminal of the counter 16 becomes high level, and the output terminal of the AND gate 21 also becomes high level so that a stop command is applied to the recording control circuit 26 and to the motor control circuit 21. Consequently, even if some trouble occurs to the travel of the cans during one cycle of the recording operation, the recording continues until one cycle of the recording operation finishes. To this end, it is necessary to provide a space $l$ sufficient to transport at least one can 9 between the trouble detector 7 and the recording head 5. After removing the cause of trouble, the reset switch 65 is pushed to reset the flip-flop 25 so that the output terminal Q of the flip-flop 25 returns to low level to allow the start of normal operation.

After occurrence of the stop command due to the abnormal state, if the conveyer 8 moves by inertia until a succeeding can following the can of which the recording has just finished blocks the light to the light sensing element 4b of the can detector, there occurs incovenience in recording on the succeeding can in the re-start cycle because the counter 15 begins its counting while the succeeding can exceeds the can detection position. It is, therefore, desirable to set the space $l_1$ between two adjacent cans, as shown in FIG. 1, to be longer than the distance possibly moved by inertia. If the space $l_1$ is shorter than the distance the succeeding can 9, if it blocks the light of the can detector, should be removed or the conveyer 8 should be removed or the conveyer 8 should be reversely moved to move the can 9 back away from the can detector.

Figure 4:
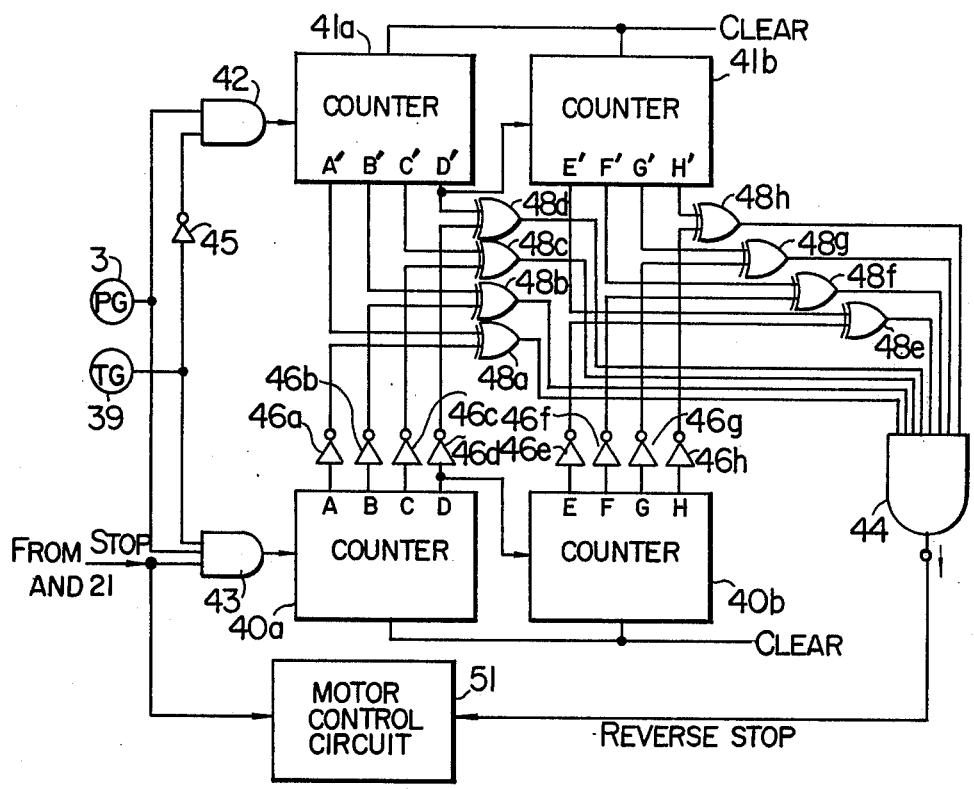
FIG. 4 shows a block diagram of a control circuit for preventing the occurrence of defective record due to the superfluous movement by inertia.

The embodiment of FIG. 4 shows a control circuit for moving the conveyor 8, in the reverse direction when the recording and conveyer are successively stopped by the occurrence of such trouble, the can 9 which blocks the light of the detector can be moved back by a distance which is predetermined to be about the same as the distance possibly moved by the inertia by the control circuit of FIG. 4. Decimal digital counters 40a and 40b count the number of pulses generated from the pulse generator 3 and applied thereto through an AND circuit 43 while the conveyer 8 moves by inertia after generation of stop command from the AND gate 21 and decimal digital counters 41a and 41b count the number of pulses generated from the pulse generator 3 and applied thereto through an AND gate 42, while the conveyer moves in the reverse direction. Exclusive OR gates 48a to 48h have first input terminals connected to output terminals A to H of the counters 40a and 40b through inverters 46a through 46h, respectively, and second input terminals connected to output terminals A' to H' of the counters 41a and 41b respectively, and have output terminals connected to input terminals of the AND gate 44. In response to the high level signal from the output terminal of the AND gate 44, the motor control circuit 51 stops the reverse operation of the drive motor 50. The tachometer 39 produces high level output during the movement of the conveyer 8 in the forward direction and produces low level outputs during the movement in the reverse direction. The AND gate 43 allows the pulses from the pulse generator 3 to pass therethrough to the counter 40a under the presence of the stop command from the AND gate 21 and the high level signal from the tachometer 39, while the AND gate 42 allows the pulses from the pulse generator 3 applied to its one input terminal to pass therethrough the counter 41a under the presence of a low level signal of the tachometer 39 which is inverted to a high level signal by an inverter 45 before applied to the other input terminal of the AND gate 42.

With the above arrangement, when the conveyer 8 moves in the forward direction at its normal operation, if a high level stop signal is produced from the AND gate 21, the AND gate 43 allows the output pulses from the pulse generator 3 to be applied to the counter 40a so that the pulses are counted by the counters 40a and 40b. The count of pulses corresponds to the distance of movement by inertia of the conveyer 8. If the conveyer 8 (motor 50) is moved in the reverse direction in the manner as stated in connection with FIG. 2, after the cause of the trouble in feeding the cans has been removed, the output of the tachometer 39 becomes low level and the AND gate 43 is closed while the AND gate 42 is opened. Thus, the output pulses from the pulse generator 3 are applied to the counter 41 and counted by the counters 41a and 41b. When the contents of the counter 40a and 40b corresponding to the distance by which the conveyer 8 moved by inertia becomes equal to the contents of the counters 41a and 41b corresponding to the distance by which the conveyer 8 moved in the reverse direction, all the outputs of the exclusive OR gates 48a through 48h become high level and the AND gate 44 produces a reverse stop signal to stop the movement of the conveyer in the reverse direction. The movement by inertia in the reverse direction after generation of the reverse stop signal is negligible since the reverse operation is effected at sufficiently low speed, and hence the conveyer 8 can be moved back to the position where it was when the stop command was generated. Thus, the apparatus is brought to the condition capable of restarting.

Figure 2:
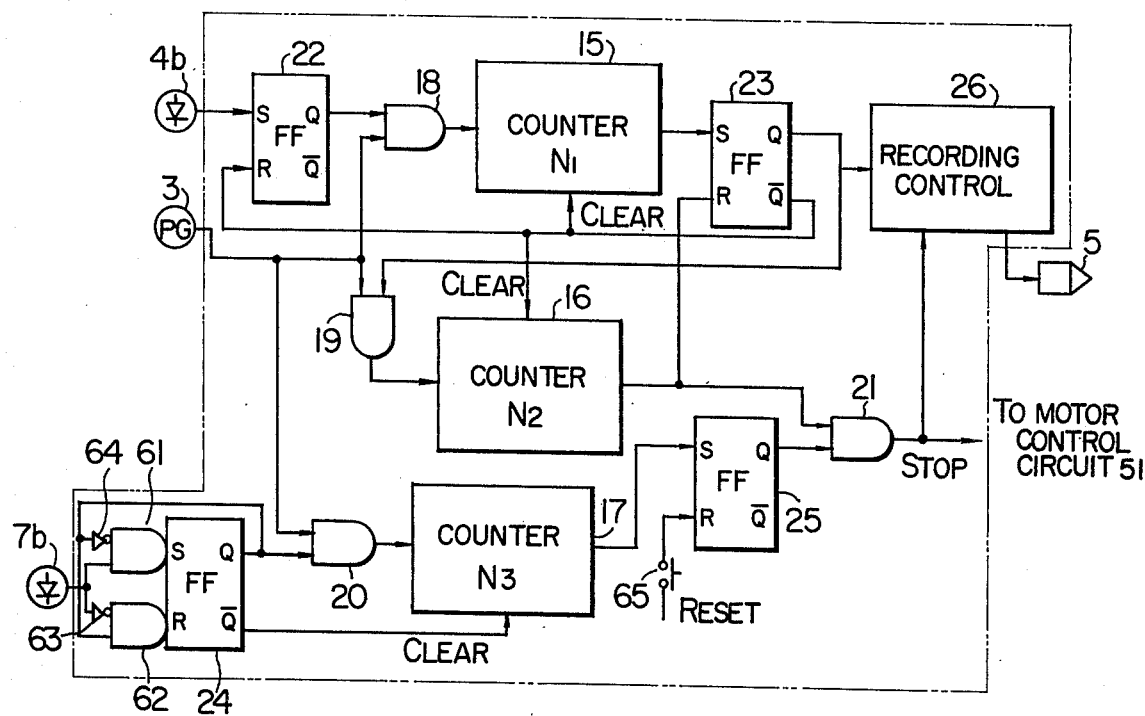
FIG. 2 shows a block diagram of a control 15 circuit for driving the apparatus.
Figure 5:
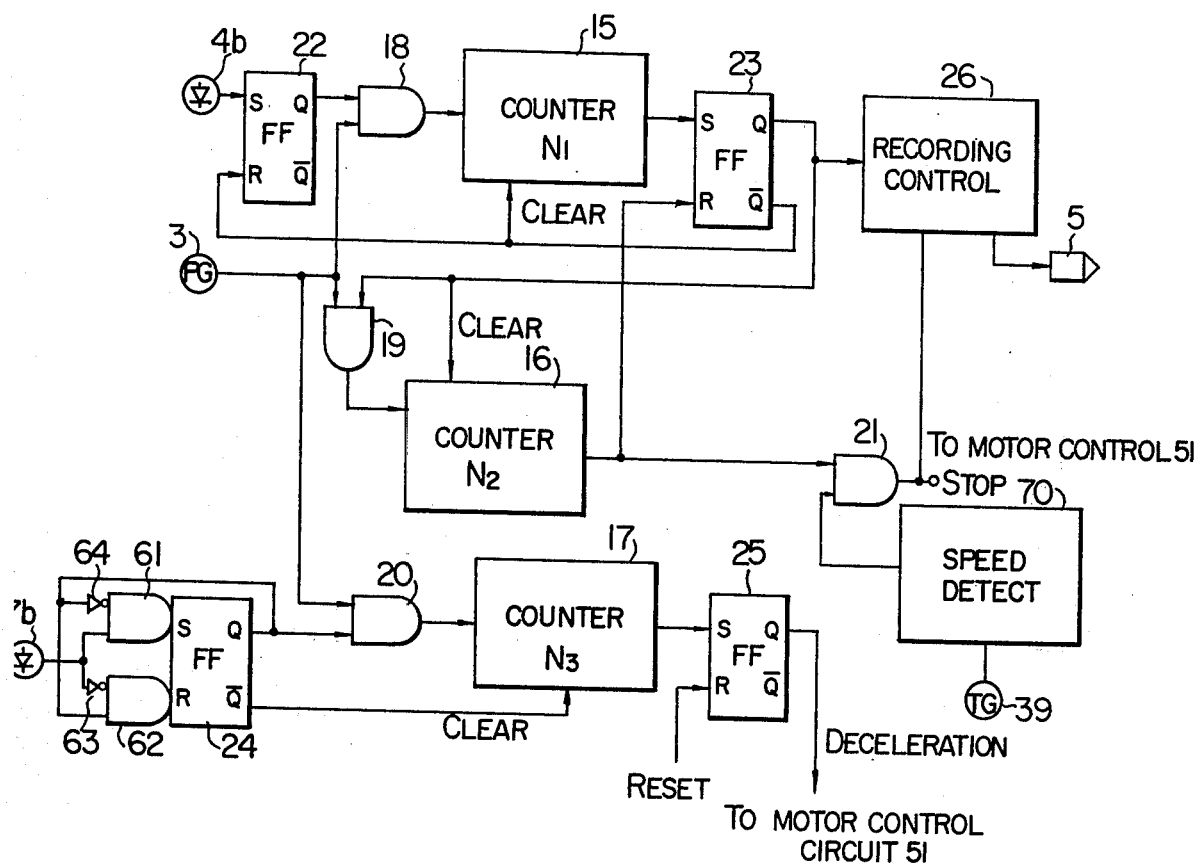
FIG. 5 shows a block diagram of another control circuit which prevents the occurrence of defective record due to the superfluous movement.

FIG. 5 shows a modification of the embodiment of FIG. 2, which is capable of the stop of the conveyer 8 within a very short distance of movement by inertia. In this modification, the control circuit 51 causes the motor 50 to decelerate in response to the high level output at the output terminal Q of the flip-flop 25 and a speed detection circuit 70 detects the speed of the motor which is proportional to the output voltage of the tachometer 39 and produces a high level signal, when the output voltage of the tachometer 39 becomes less than a predetermined value corresponding to a predetermined conveyer speed which is selected so that the movement by inertia of the conveyer is negligible if the stop command is given to the motor control when the conveyer is moving at a speed less than the predetermined conveyer speed. The speed detection circuit may be a conventional comparator circuit accommodated with an amplifier.

We claim:

1. An ink jet recording apparatus wherein information patterns are recorded on articles in the form of dot matrix by a recording head which ejects ink droplets in a direction toward recording surface of each of said articles conveyed by a conveyer as changing the direction of the ink droplets to apply the droplets to a predetermined area of the each article, said apparatus comprising:
   drive means for driving said conveyer,
   recording control means for controlling the operation of said recording head,
   trouble detection means for detecting the movement of the recorded articles conveyed by said conveyer,
   record completion detection means for detecting the completion of record for each of the articles, and
   means for stopping the operation of said driving means and said recording control means under the presence of the output signals of said trouble detection means and said record completion detection means.

2. An ink jet recording apparatus according to claim 1 wherein said trouble detection means is separated from said recording head by a distance larger than a length twice as much as the length of said article measured in the direction of its travel by said conveyer.

3. An ink jet recording apparatus according to claim 1 further comprising;
   forward movement detection means for measuring the distance of movement by inertia of said conveyer in the forward direction after generation of the output of said stopping means,
   means for moving the conveyer in the reverse direction,
   reverse movement detection means for measuring the distance of movement of said conveyer in the reverse direction, and
   means for moving the conveyer in the reverse direction after the stop of movement of said conveyer in the forward direction until the distance measured by said reverse movement detection means reaches a value equal to the distance measured by said forward movement detection means.

4. An ink jet recording apparatus according to claim 1 further including means for detecting a predetermined speed of movement of the conveyer, said stopping means operating to stop the conveyer and the recording operation under the presence of the outputs of said conveyer speed detecting means, said trouble detection means and said record completion detection means.

* * * * *